United States Patent
Jeong

(10) Patent No.: US 6,480,496 B1
(45) Date of Patent: Nov. 12, 2002

(54) APPARATUS AND METHOD FOR RESTORING CELL STORAGE REGIONS IN AN ATM SWITCH AND METHOD THEREFOR

(75) Inventor: Jae-Hun Jeong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,666

(22) Filed: Dec. 29, 1998

(30) Foreign Application Priority Data

Dec. 29, 1997 (KR) .......................................... 97/75959

(51) Int. Cl.[7] .............................................. H04L 12/56
(52) U.S. Cl. .................... 370/395.7; 370/242; 370/428; 370/474; 714/754
(58) Field of Search ........................ 370/395.7, 395.71, 370/395.72, 412, 428, 429, 252, 395.3, 395.31, 389, 242, 474; 714/754

(56) References Cited

U.S. PATENT DOCUMENTS

| | | | |
|---|---|---|---|
| 5,124,977 A | * 6/1992 | Kozaki et al. | ............. 370/58.1 |
| 5,184,346 A | 2/1993 | Kozaki et al. | ................ 370/60 |
| 5,481,536 A | 1/1996 | Reisch et al. | .............. 370/60.1 |
| 5,513,191 A | * 4/1996 | Takechi et al. | ............. 371/37.1 |
| 5,535,366 A | * 7/1996 | Pfeiffer et al. | ............... 395/486 |
| 5,570,368 A | * 10/1996 | Murakami et al. | .......... 370/503 |
| 5,719,890 A | * 2/1998 | Thomman et al. | .......... 714/805 |
| 5,815,499 A | 9/1998 | Unekawa | ..................... 370/395 |
| 5,822,316 A | 10/1998 | Unekawa | ..................... 370/389 |
| RE36,716 E | * 5/2000 | Kozaki et al. | .............. 370/392 |
| 2001/0005386 A1 | * 6/2001 | Sakurai et al. | .............. 370/538 |

* cited by examiner

Primary Examiner—Ricky Ngo
Assistant Examiner—Tri H. Phan
(74) Attorney, Agent, or Firm—Robert E. Busnell, Esq.

(57) ABSTRACT

An apparatus for restoring the cell data storage regions of the common memory in an asynchronous transfer mode (ATM) switch system, comprises a first multiplexer for multiplexing the cell data with the header and content data separated, a second multiplexer for multiplexing the addresses generated from a plurality of FIFO registers, an address checker for checking the addresses from the second multiplexer to generate a first and second address signals if the addresses are checked normal, an address memory storing all addresses of the common memory in error state to selectively convert the addresses into normal state according to the second address signal from the address checker, a controller for checking the address memory at predetermined intervals to restore an address stored in error state to a normal state, and an address multiplexer for generating an idle address to an IAP according to the first address signal and address restored signal.

11 Claims, 2 Drawing Sheets

APPARATUS AND METHOD FOR RESTORING CELL STORAGE REGIONS IN AN ATM SWITCH AND METHOD THEREFOR

CLAIM OF PRIORITY

This application makes reference to, incorporates the same herein, and claims all benefits accruing under 35 U.S.C. §119 from an application for APPARATUS FOR RESTORING CELL STORAGE REGIONS IN AN ATM SWITCH AND METHOD THEREFOR earlier filed in the Korean Industrial Property Office on the 29th of December 1997 and there duly assigned Ser. No. 75959/1997.

FIELD OF THE INVENTION

The present invention relates to an aparatus for restoring the cell storage regions of an ATM (Asynchronous Transfer Mode) switch having a common buffer structure, and a method therefor.

DESCRIPTION OF THE RELATED ART

Generally, data is communicated as cells in an ATM network, and each of the cells consists of 53 bytes including a header of 5 bytes and a payload of 48 bytes. The header stores information of an address, a sender, etc., while the payload stores content data in order to distribute such data cells according to addresses, there may be employed an ATM switch having a common memory structure. The earlier ATM switch comprises a first multiplexer for multiplexing the cells with the header and content data separated, a common memory for storing the content data generated from the first multiplexer, a plurality of FIFO (first-in first-out) registers having the same number as the output ports to store the addresses for the content data by the headers, an idle addresses for the content data stored in the common memory, a second multiplexer for multiplexing the outputs of the FIFO registers, an address checker for checking the state of the addresses generated from the second multiplexer to store them into the idle address pool, and a demultiplexer for distributing the data output from the common memory among the output ports.

In operation, an ATM cell applied from a subscriber's board or another system to the ATM switch is separated by the multiplexer into the header and payload. The header determines the output port for the content data stored in the payload of the ATM cell. The content data is stored into the common memory at an address designated by the idle address pool storing the idle addresses of the common memory. The header is stored into the corresponding FIFO register together with the address where the content data is stored into the common memory. Each register generates the address where the header and content data of the ATM cell are stored towards the multiplexer according to a read signal generated from a read time generator. Then the multiplexer generates towards the address checker the address of the common memory where the content data of the ATM cell, and towards the common memory a read signal to read the data of the address transferred to the address checker. The data read from the common memory is demultiplexed by the demultiplexer generated through respective output port. Meanwhile, the address checker checks if there is an error in the received addresses. The address checker cancels the erroneous address, or transfers the correct address to the idle address pool (IAP). The IAP goes on storing the addresses where the content data may be stored into the common memory.

In this case, whenever the address checker cancels erroneous address, there is reduced the number of the addresses where the content data may be stored into the common memory. Namely, although there has occurred to errors in the common memory, the addresses where the content data may be stored into the common memory are converted into the error state, thus making it impossible to use the storage regions of the erroneous addresses. If stored in the IAP, the erroneous address stored into the IAP may cause a loss of the data of the ATM cell. However, if allowed to continue, the number of erroneous addresses stored into the address checker from the registers through the multiplexer, the number of the addressses stored in the IAP becomes reduced accordingly. In order to restore the storage regions of the common memory, the operator must detach the board mounted with the switch from or reset the system to restore the IAP.

Takechi et al U.S. Pat. No. 5,513,191 discloses an Asynchronous Transfer Mode (ATM) Cell Error Processing System. In addition to an error detector, Takechi et al discloses an error editing unit. This error editing unit has the function of determining for each of the ATM cells, whether based on the respective and corresponding decision signals, a respective ATM cell should be discarded. Takechi et al does not indicate that the error editing unit restores error cells because of an erroneous address. What is needed is a method and apparatus for ATM networks for restoring cells having erroneous addresses.

SUMMARY OF THE INVENTION

It is an object of the present invention to provide an apparatus for restoring the idle addresses of the common memory in an ATM switch system without detaching or resetting the system.

It is yet another object of the present invention to provide a method and apparatus for an ATM network for restoring cells that have erroneous addresses.

According to one aspect of the present invention, an apparatus for restoring the cell data storage regions of the common memory in an asynchronous transfer mode (ATM) switch system, comprises a first multiplexer for multiplexing the cell data with the header and content data separated, a second multiplexer for multiplexing the addresses generated from a plurality of FIFO registers, an address checker for checking the addresses from the second multiplexer to generate a first and second address signals if the addresses are checked normal, an address memory storing all addresses of the common memory in error state to selectively convert the addresses into normal state according to the second address signal from the address checker, a controller for checking the address memory at predetermined intervals to restore an address stored in error state to a normal state, and an address multiplexer for generating an idle address to an IAP according to the first address signal and address restored signal.

According to another aspect of the present invention, an ATM switch system, which includes a common memory, an address checker, address multiplexer and controller for checking the address memory to restore the addresses of the common memory, is provided with a method for restoring the cell data storage regions of the common memory, which comprises the steps of causing the address checker to check during operation of the timer of the controller whether multiplexed read addresses are correct, writing corresponding storage regions of the address memory with correct addresses or canceling erroneous addresses according as the multiplexed read addresses are correct or not, sequentially checking the addresses of the address memory upon termination of the timer, and restoring the erroneous addresses checked in the previous step into correct state,

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
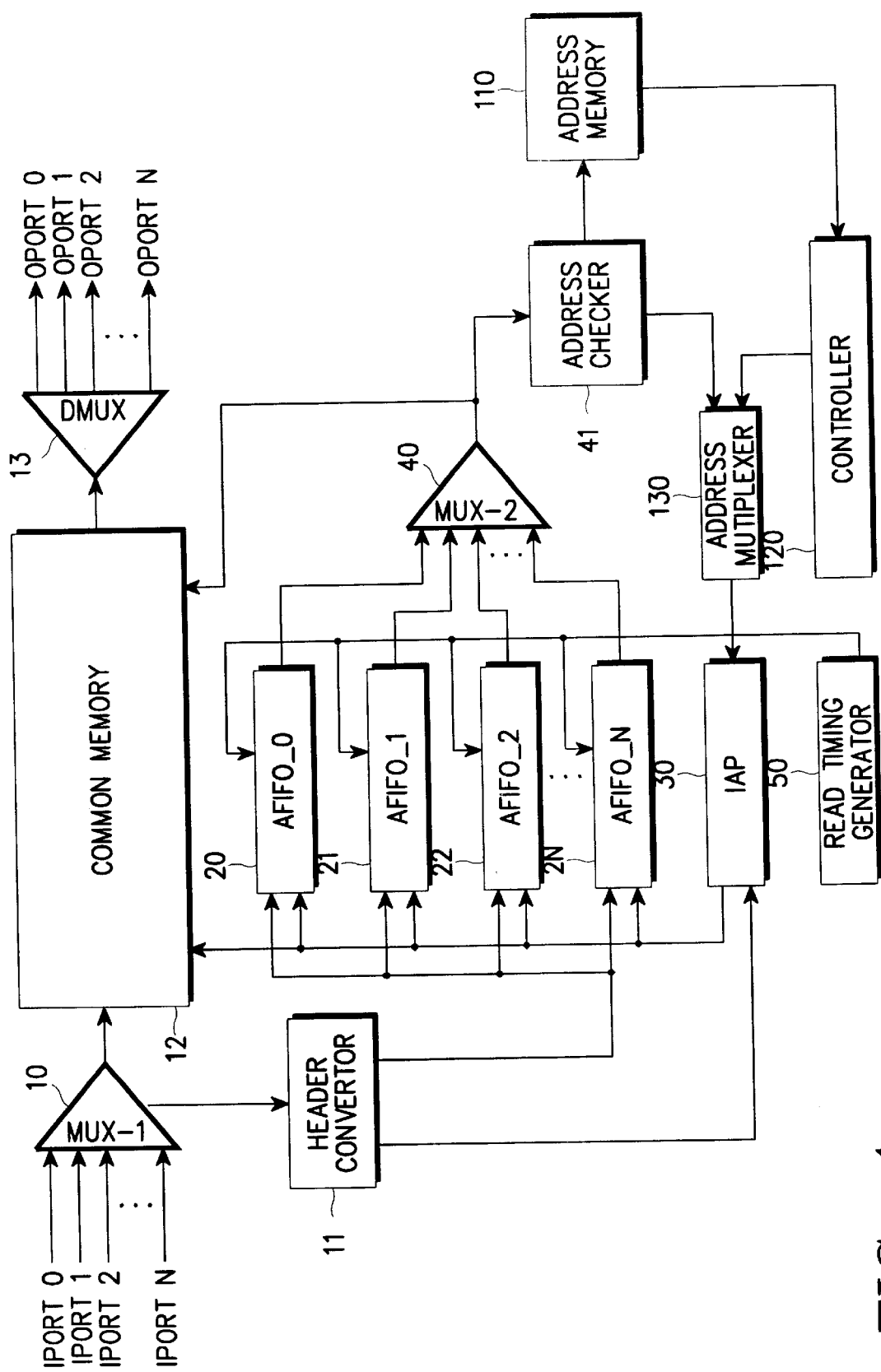
FIG. 1 is a block diagram for illustrating an ATM common buffer switch according to the present invention.

Referring to FIG. 1, the cell data (hereinafter referred to as 'cell') are inputted through a plurality of input ports IPORT0, IPORT1, IPORT2, . . . , IPORTN to a first multiplexer MUJX-1 10, which separates the cells into the headers and content data respectively transferred to a header converter 11 and common memory 12. The header converter analyzes the headers to inform an IAP 30 of effective cells. The IAP 30 generates idle addresses to the common memory 12 and a plurality of FIFO registers leaving the same number as the output ports . In addition, the header converter 11 determines the output ports of the inputted cells by checking the headers, transferring the headers to the registers corresponding thereto. Hence, the registers store the headers generated from the header converter 11 and the addresses generated from the IAP 30. The FIFO registers have respective output ports. For example, AFIFO-0 20 pairs up with output port OPORT0, and AFIFO-1 21 with OPORT1. Table 1 shows the registers storing the headers and addresses.

TABLE 1

| Input Port | Input Data | Address Register | Storage Address | Output Port |
|---|---|---|---|---|
| IPORT0 | Valid | AFIFO-2 | a | OPORT-2 |
| IPORT1 | Invalid | | | |
| IPORT2 | Valid | AFIFO-0 | d | OPORT-0 |
| . | . | . | . | . |
| . | . | . | . | . |
| . | . | . | . | . |
| IPORTN | Valid | AFIFO-1 | m | OPORT-1 |

The data inputted to each input port is separated into the header and content data through the first multiplexer. The input data is checked as valid or invalid by the header converter 11. The head converter determines the output port upon checking the input data as valid to generate an address write control signal to the register corresponding to the output port while informing the IAP 30 of the input data being valid. Then, the IAP 30 generates an idle address whereby the header and the address of the common memory are stored into the register selected by the header of the ATM cell. The common memory 12 stores the data inputted from the first multiplexer 10 at the address designated by the IAP 30, which deletes the idle address outputted. Thus, the IAP 30 goes on storing the addresses where the data is stored into the common memory.

In order to retrieve the data stored in the common memory, a read timing generator 50 generates read signals sequentially transferred to the registers to generate the addresses in the order of time in which they are stored. The output of each register is transferred to the second multiplexer 40 to determine the address of the data stored and the output port. The second multiplexer 40 multiplexes the addresses received from the registers to generate read address signals to the common memory 12 and address checker 41. The common memory 12 generates the data corresponding to the addresses multiplexed by the multiplexer 40 to the demultiplexer 13, which demultiplexes the data received from the common memory 12 transferring it to the output ports.

Meanwhile, the address checker 41 checks whether the addresses received from the second multiplexer 40 are valid. If the addresses are valid, the address checker 41 generates a second address signal to an address memory 110, and a first address conversion signal to the address multiplexer 130. The address memory 110 stores the same addresses with those of the common memory 12, initially set into the error state. It is assumed that the error region be set to '1'and the correct region be reset to '0'. If the address checker 41 checks the received address as valid, it generates the second address conversion signal to reset the address memory 110 to '0'. The address multiplexer 130 transfers the second address signal received from the address checker 41 to the IAP 30 to store the address transferred from the common memory 12 to the demultiplexer 13 as an idle address. On the other hand, the address checker 41 cancels the address checked as invalid. Such canceling of the address does not relate to malfunction of the common memory 12, but because of an error occurring in the address received from the second multiplexer 40.

The controller 120 checks the address memory 110 at predetermined intervals to detect the addresses set to '1', correcting them transferred to the address multiplexer 130. The address multiplexer 130 transfers the address received from the controller 120 to the IAP 30. Completing the checking of the address memory 110, the controller 120 converts all the addresses of the address memory to the error state.

Figure 2:
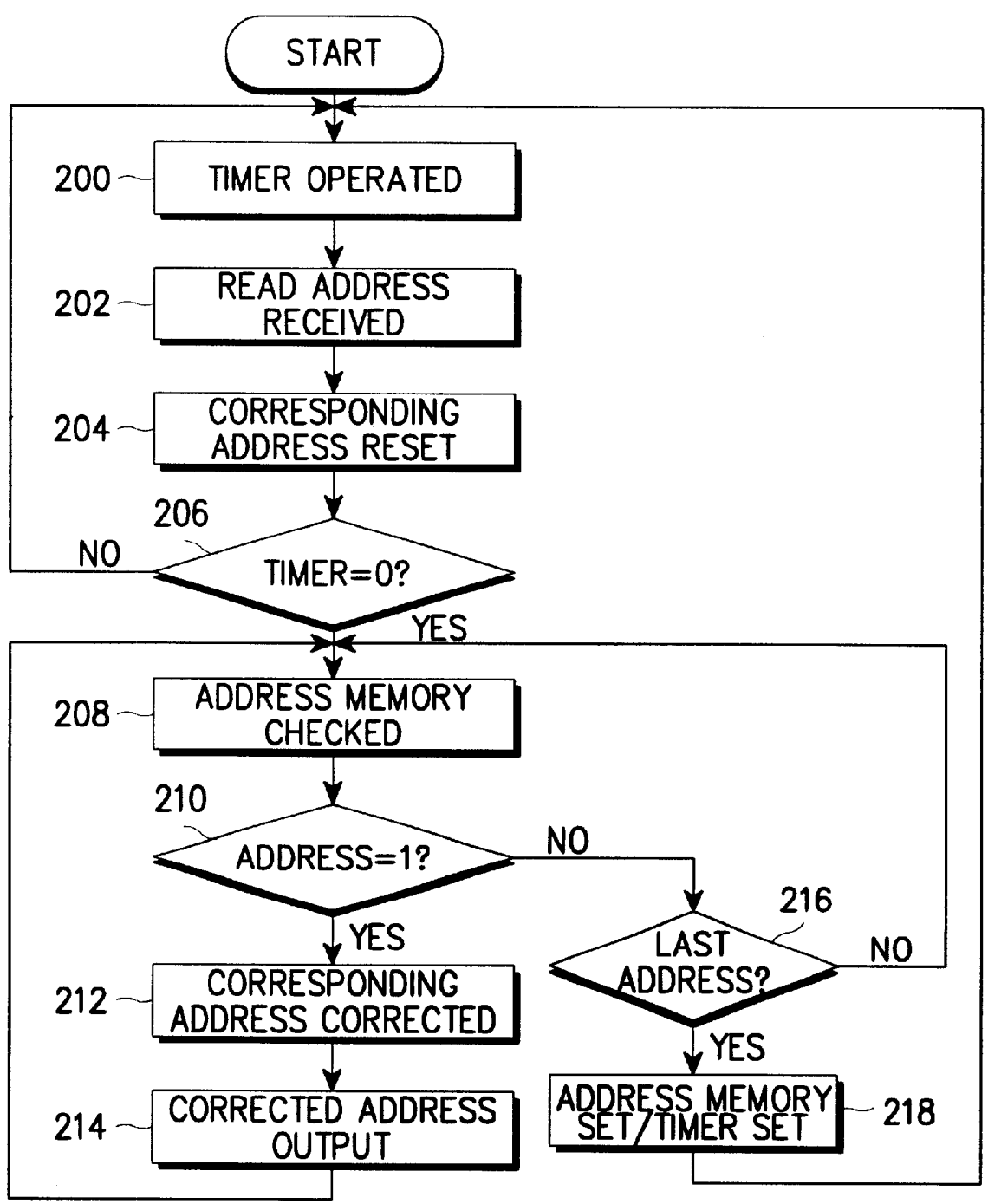
FIG. 2 is a flowchart for illustrating the steps of restoring the canceled addresses according to the present invention.

Describing the steps of restoring the canceled address in connection with FIG. 2, the controller 120 starts an internal timer set to a predetermined time to determine the time for checking the address memory 110, in step 200. Meanwhile, the address checker 41 receive a read address signal from the second multiplexer 40 to determine whether the address is valid, in step 202. When the address is valid, the corresponding address of the address memory 110 is reset. Namely, the address checker 41 receives addresses from the second multiplexer 40 to continuously collect the state of the addresses stored in the address memory 110 while the controller 120 checks until the timer reaches '0'in step 206. If the timer reaches '0', the controller 120 sequentially checks the addresses stored in the address memory 110 one by one to detect whether there is an address set to '1'in step 208. Detecting the address set to '1'the controller 120 goes to step 212, or otherwise to step 216. In step 212, the controller 120 reads the corresponding address corrected from the address memory 110. Then, the controller 120 goes to step 214 to generate the corrected address to the multiplexer 130 to store into the IAP 30, so that the canceled address is restored into the IAP 30. Finally, the controller goes to step 208.

On the other hand, going from step 210 to step 216, the controller 120 determine whether the checked address is the last. Detecting the last address, the controller 120 goes to step 218, or otherwise to step 208. In step 218, the controller 120 sets the states of all the addresses of the address memory 110 to '1'. Namely, setting the addresses to the previous error state, the controller 120 sets the timer to the predetermined time, going to step 200. Thus, the controller restores the addresses by periodically checking the address memory without detaching or resetting the system.

What is claimed is:

1. An apparatus for restoring the cell data storage regions of the common memory in an asynchronous transfer mode (ATM) switch system, said apparatus comprising:

a first multiplexer multiplexing cell data with the header and content data separated;

a second multiplexer multiplexing the addresses generated from a plurality of first-in first-out registers;

an address checker checking said addresses from said second multiplexer to generate first and second address signals when said addresses are checked normal;

an address memory storing all addresses of said common memory determined by said address checker to be invalid and to selectively convert said addresses of said common memory into valid addresses according to said second address signal from said address checker;

a controller checking said address memory at predetermined intervals to replace an erroneous address with a valid address absent deleting data, resetting the ATM switch, losing an address in memory or reinitializing the ATM switch; and an address multiplexer generating an idle address to an idle address pool according to said first address signal and said second address signal.

2. The apparatus of claim 1, said address checker cancels an address signal received from said second multiplexer if said address signal is determined to be erroneous.

3. The apparatus of claim 1, said first address signal is transferred to said idle address pool to point to a location in said common memory where data is to be stored.

4. A method for restoring the cell data storage regions of a memory in an ATM switch system, said method comprising the steps of:

providing a common memory, an address checker, address multiplexer and controller for checking an address memory to replace erroneous addresses with valid addresses of said common memory;

using said address checker to check whether multiplexed read addresses are valid during operation of a timer for said controller;

writing to corresponding storage regions of said address memory using valid addresses when the multiplexed read addresses are valid and replacing erroneous addresses with valid addresses when said multiplexed read addresses are determined to be erroneous without deleting data, resetting the ATM switch, losing an address in memory or reinitializing the ATM switch;

sequentially checking addresses of said address memory upon termination of said timer; and replacing erroneous addresses detected while performing said step of sequentially checking with valid addresses.

5. The method of claim 4, further comprising the steps of determining whether the checked address is the last, converting all addresses of said address memory into erroneous addresses when the last address is checked, and setting said timer.

6. An apparatus for restoring erroneously addressed cells in an asynchronous transfer mode (ATM) network, said apparatus comprising:

a common memory;

an address memory storing all addresses of said common memory in an erroneous state and selectively converting said addresses into valid addresses according to a first address signal from an address checker;

a controller checking said address memory at predetermined intervals to replace erroneous addresses with valid addresses without deleting data, resetting the ATM network, losing an address in memory or reinitializing the ATM network; and an address multiplexer generating an idle address to an idle address pool according to a second address signal and an address restored signal.

7. The apparatus of claim 6, further comprising an address checker checking addresses from a first multiplexer to generate a first and a second address signal when said addresses from said first multiplexer are determined to be valid.

8. The apparatus of claim 7, said first multiplexer multiplexes addresses generated from a plurality of first-in first-out registers.

9. The apparatus of claim 8, further comprising a second multiplexer multiplexing cell data having a header and content separated.

10. The apparatus of claim 9, said address checker cancels an address signal received from said second multiplexer when said address signal is determined to be erroneous.

11. The apparatus of claim 9, said second address signal being transferred to said idle address pool to point to a location in common memory where data is to be stored.

* * * * *